United States Patent [19]

Ina et al.

[11] Patent Number: 4,751,783
[45] Date of Patent: Jun. 21, 1988

[54] AZIMUTH DETERMINATION APPARATUS

[75] Inventors: Katsuhiro Ina, Okazaki; Yuji Hirabayashi, Aichi; Susumu Akiyama, Kariya; Kazushi Akutsu; Kiyohumi Kage, both of Oobu, all of Japan

[73] Assignee: Nippondenso Co., Ltd., Kariya, Japan

[21] Appl. No.: 57,177

[22] Filed: Jun. 3, 1987

[30] Foreign Application Priority Data

Jun. 5, 1986 [JP] Japan .................. 61-130521

[51] Int. Cl.$^4$ ............................................. G01C 17/28
[52] U.S. Cl. .................................... 33/361; 324/254
[58] Field of Search ................ 33/356, 361; 324/254; 364/571

[56] References Cited

U.S. PATENT DOCUMENTS 4,413,424 11/1983 Sasaki et al. .
4,416,067 11/1983 Scherer et al. .
4,497,034 1/1985 Kuno et al. .

FOREIGN PATENT DOCUMENTS 57-28208 2/1982 Japan .
58-24811 2/1983 Japan .
59-100812 6/1984 Japan .

Primary Examiner—Harry N. Haroian
Attorney, Agent, or Firm—Cushman, Darby & Cushman

[57] ABSTRACT

Disclosed is an azimuth determination apparatus attached to a motor vehicle for determinating the forward direction of the vehicle. The azimuth determination apparatus includes an azimuth sensor for generating orthogonal first and second signals indicative of the forward direction of the vehicle. Two azimuth vectors are obtained on the basis of the orthogonal first and second component signals, first components of the two azimuth vectors being maximum and minimum. The determination is made in terms of the fact that the difference between second components of the two azimuth vectors is below a predetermined value. In accordance with the determination, the orthogonal first and second component signals are corrected on the basis of said two azimuth vectors so that the accurate moving direction of the motor vehicle can be obtained irrespective of the remanence of the vehicle.

2 Claims, 5 Drawing Sheets

AZIMUTH DETERMINATION APPARATUS

BACKGROUND OF THE INVENTION

The present invention relates generally to azimuth determination apparatus for determining the forward direction of a moving body on the basis of earth magnetism, and more particularly to such an azimuth determination apparatus including means for cancellation of an output error of an azimuth sensor on the basis of information obtained by a circular movement of the moving body.

An important problem in azimuth detection apparatus for determining the forward direction of a moving body on the basis of earth magnetism relates to the correction of an output error, or offset, of azimuth sensor resulting from magnetism attached to the moving body or azimuth sensor. One approach to resolution of the problem, such as is disclosed in Japanese Patent Provisional Publication No. 58-24811, is to form a circular vector locus in accordance with two orthogonal component signals generated from the azimuth sensor during a circular movement of the moving body and then to detect the center of the vector locus using the maximum and minimum values of the respective two orthogonal component signals thereby correcting the signals from the azimuth sensor on the basis of the detected vector locus center.

In this azimuth determination apparatus as disclosed in the above-mentioned prior art, the decision of termination of the circular movement of the moving body is made by comparison between the azimuth vectors obtained by the outputs of the azimuth sensor before and after the circular movement of the moving body, that is, under the condition that the azimuth vectors before and after the circular movement become substantially equal to each other. However, according to this decision method, when the rotating direction of the moving body is changed during the circular movement, the azimuth vector before the circular movement may become substantially equal to an azimuth vector obtained in the course of the circular movement, or at the time of the change of the rotating direction. This causes an erroneous decision of termination of the circular movement and makes impossible detection of accurate maximum and minimum values, resulting in difficulty of accurate correction of the outputs of the azimuth sensor.

SUMMARY OF THE INVENTION

It is therefore an object of the present invention to provide an azimuth determination apparatus which is capable of accurate correction of the output error of an azimuth sensor irrespective of the change of rotating direction during a circular movement of a moving body.

The technique of the presen invention involves detection of two azimuth vectors having maximum and minimum X-components (or Y-components) which are obtained on the basis of orthogonal component signals from an azimuth sensor responsive to earth magnetism and elimination of errors of the orthogonal two component signals under the conditions that the difference between the maximum and minimum X-components of the two azimuth vectors is below a predetermined value.

In accordance with the present invention, there is provided an azimuth determination apparatus attached to a moving body, comprising: means for generating orthogonal first and second component signals in response to earth magnetism; means responsive to the orthogonal first and second component signals for computing the forward direction of the moving body; means for detecting two of azimuth vectors obtained on the basis of the orthogonal first and second component signals, first components of the two azimuth vectors being maximum and minimum; means for determining that the difference between second components of the two azimuth vectors is below a predetermined value; and means for correcting the orthogonal first and second component signals on the basis of the two azimuth vecotrs in accordance with a result of the determination.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
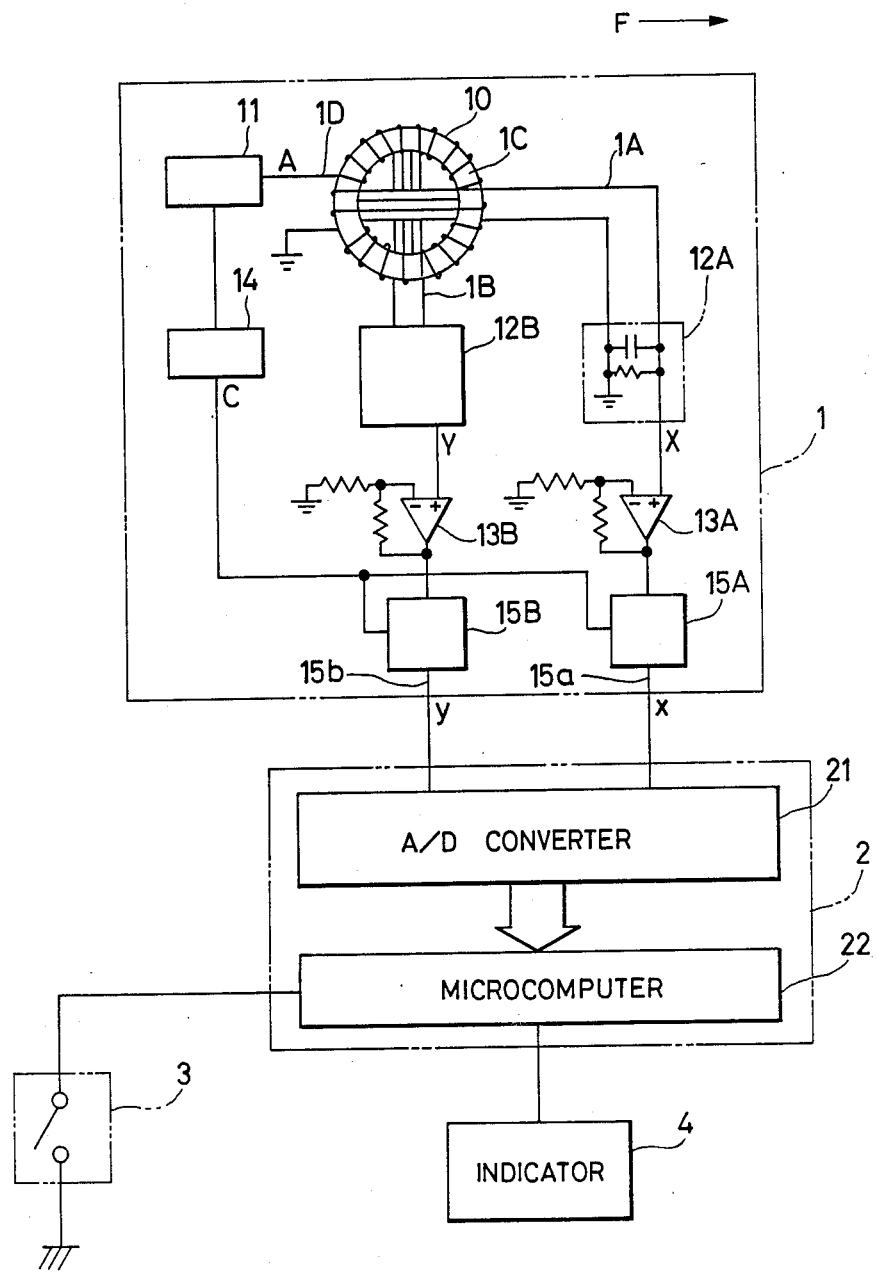
FIG. 1 is an illustration of an azimuth determination apparatus according to an embodiment of the present invention.
Figure 2:
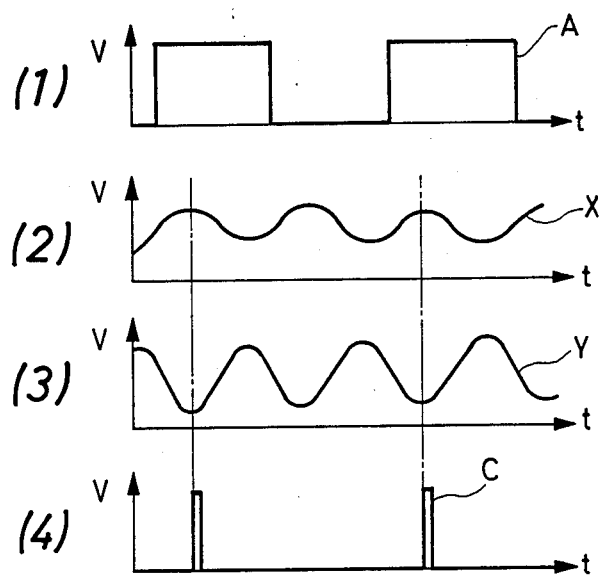
FIG. 2 is a timing chart of output waveforms for description of the azimuth determination apparatus of FIG. 1.

Referring now to FIG. 1, there is illustrated an azimuth determination apparatus according to an embodiment of the present invention which may be employed as an apparatus for measuring the moving, or forward, direction of a moving body such as a motor vehicle. The azimuth determination apparatus is shown in FIG. 1 as comprising an azimuth detection unit 1 for detection of the forward direction of the moving body on the basis of earth magnetism and a control unit 2 including a correction unit for cancellation of an output error, or offset, of the azimuth detection unit 1 caused by, for example, the magnetism attached to the body of the azimuth detection unit 1 or the moving body. The azimuth detection unit 1 includes an azimuth sensor 10 which comprises a core 1C made of a ferromagentic material, an excitation winding 1D wounded around the core 1C and output windings 1A and 1B which are respectively wounded on the core 1C to cross each other at right angles. Also included in the azimuth detection unit 1 is an oscillator circuit 11 for generating a rectangular wave signal A, indicated by (1) in FIG. 2, which in turn excites the excitation winding 1D at a frequency of f. The magnetic field in the core 1C varies in accordance with the sum (H+h) of the horizontal component H of the earth magnetism applied to the azimuth sensor 10 and the horizontal component h of the distortion of the earth magnetism whereby the output windings 1A and 1B generate outputs coresponding to the magnetic field in the core 1C. The output windings 1A and 1B are respectively coupled to filters 12A and 12B of the same construction, each of which comprises a capacitor and a resistor. The filters 12A and 12B respectively in response to the outputs of the output windings 1A and 1B generates outputs X and Y having the frequency 2f component, as indicated by (2) and (3) in FIG. 2. After amplified by amplifier circuits 13A and 13B, the outputs X and Y are respectively sampled and held by hold circuits 15A and 15B in response to a signal C from a timing circuit 14, as indicated by (4) in FIG. 2, so that dc outputs x and y appears at points 15a and 15b.

Figure 3:
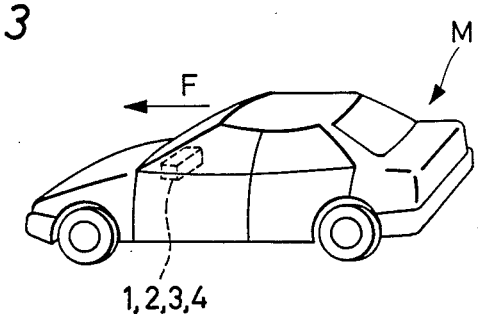
FIG. 3 is an illustration of the FIG. 1 azimuth determination apparatus mounted in a motor vehicle.

The dc outputs x and y are coupled to the control unit 2 where they are inputted into a microcomputer 22 through an A/D converter 21. The microcomputer 22 is also coupled to a switch 3 which is operated by a vehicle diver and which generates, in response to the operation, a timing signal representative of the start of correction of the data obtained by the azimuth detection unit 1. For the correction the motor vehicle M is rotated by 360° or more and the switch 3 is operated immediately before the start of the vehicle revolution. The microcomputer 22 computes the azimuth of the forwarding direction of the motor vehicle M on the basis of the output signals from the azimuth detection unit 1 and the correction start switch 3, and the results of the computation is indicated on an indicator 4 mounted at a visible portion of in the motor vehicle M as shown in FIG. 3. The azimuth determination apparatus will be also mounted in the motor vehicle to be directed in the moving direction F of the vehicle M.

Figure 4:
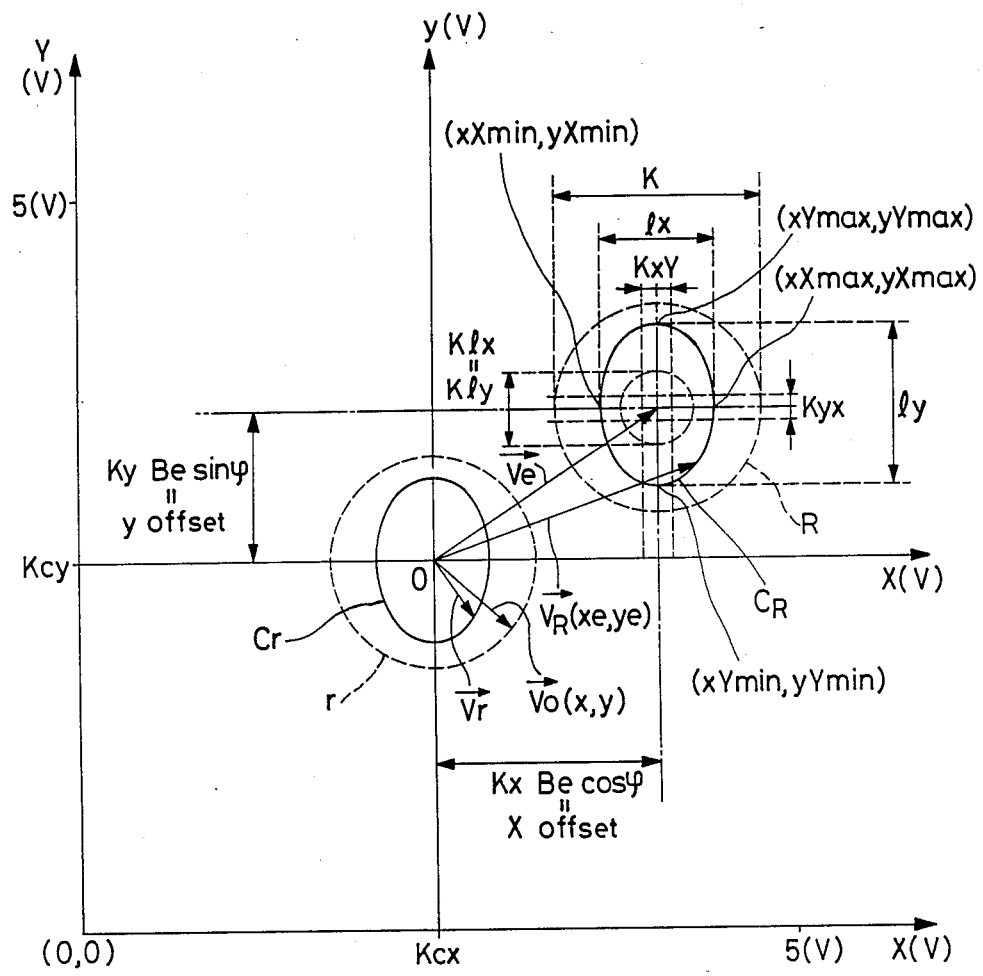
FIG. 4 is a diagram illustrating azimuth vectors and vector loci obtained on the basis of the outputs of the azimuth detection unit of the FIG. 1 apparatus.

FIG. 4 is an illustration for describing the relation between the azimuth vector measured by the azimuth detection unit 1 and the forward direction F of the motor vehicle M.

In FIG. 4, the X-axis represents the output of the output winding 1A and the Y-axis represents the output of the output winding 1B. The Y-axis is coincident in direction with the magnetic north. Here, it is assumed that the magnetic north is coincident in direction with the north pole in geography.

The outputs X and Y of the output windings 1A and 1B in absence of errors due to the remanence of the motor vehicle M can be expressed by the following equations (1) and (2);

$$X = Kx \cdot B\cos\theta + Kcx \tag{1}$$

$$Y = Ky \cdot B\sin\theta + Kcy \tag{2}$$

where Kx and Ky are respectively coefficients depending upon output gains of the output windings 1A and 1B, B represents a magnetic flux density due to the horizontal component of the earth magnetism, $\theta$ represents an angle between the forward direction F of the motor vehicle M and the horizontal component of the earth magnetism, and Kcx and Kcy are constants used for setting as a virtual origin the intersection of the x-axis and y-axis in a coordinate system in units of volts.

When a magnetic flux density Be is introduced into the earth magnetism because of the remanence of the motor vehicle M, the outputs Xe and Ye of the output windings 1A and 1B are expressed by the following equations (3) and (4);

$$Xe = Kx \cdot B\cos\theta + Kx \cdot Be\cos\psi + Kcx \tag{3}$$

$$Ye = Ky \cdot B\sin\theta + Ky \cdot Be\sin\psi + Kcy \tag{4}$$

where $\psi$ is an angle between the horizontal component of the earth magnetism and the forward direction F of the motor vehicle M caused by the remanence of the vehicle M.

If x-axis and y-axis in FIG. 4 are virtual coordinate axes, the equations (1) and (2) can be rewritten as the following equations (1') and (2') and the equations (b 3) and (4) can be rewritten as the following equations (3') and (4').

$$x = Kx \cdot B\cos\theta \tag{1'}$$

$$y = Ky \cdot B\sin\theta \tag{2'}$$

$$xe = Kx \cdot B\cos\theta + Kx \cdot Be\cos\psi \tag{3'}$$

$$ye = Ky \cdot B\sin\theta + Ky \cdot Be\sin\psi \tag{4'}$$

Therefore, a description will hereinafter be made under the condition that the outputs of the azimuth detection unit 1 are indicated in accordance with the x-axis and y-axis in FIG. 4.

In FIG. 4, (x, y) in the equations (1') and (2') is represented as a vector $\vec{Vr}$ and the the locus thereof forms an ellipse Cr. On the other hand, (xe, ye) in the equations (3') and (4') is indicated as a vector $\vec{V_R}$ and the locus thereof forms an ellipse $C_R$. The coordinate of the center of the ellipse $C_R$ is (Kx·Becos$\psi$, KyBesin$\psi$). A vector $\vec{Ve}$ corresponding to the coordinate of the center of the ellipse $C_R$ is an error vector and is a component detected by the azimuth detection unit 1 due to the remanence of the vehicle M.

In this embodiment, in order to obtain the error vector $\vec{Ve}$ (Xoffset, Yoffset) and coefficients Xgain and Ygain for correction of ellipse $C_R$ (Cr) to a circle R (r) are detected the maximum value xXmax and minimum value xXmin in the x-axis directions of the ellipse $C_R$ and the maximum value yYmax and minimum value yYmin in the y-axis thereof. The these values are obtained by, at a predetermined time interval, comparison between the outputs (xe, ye) of the azimuth detection unit 1 which varies in accordance with the circular movement of the vehicle M after the closing operation of the switch 3. The accuracy of the maximum value xXmax and minimum value xXmin in the x-axis direction is determined by checking the fact that the difference between a value yXmax on the y-axis obtained when a value in the x-axis direction is maximum and a value yXmin on the y-axis obtained when a value in the x-axis direction is minimum is below a first set value KyX. Likewise, the accuracy of the maximum value yYmax and minimum value yYmin in the y-axis direction is determined by checking the fact that the difference between a value xYmax on the x-axis when a value in the y-axis direction is maximum and a value xYmin on the x-axis when a value in the y-axis direction is minimum is below a second set value KxY. Furthermore, since the above-mentioned two conditions are satisfied immediately after the closing operation of the switch 3, the determination of accuracy of the maximum values and minimum values is made under the additional conditions that the difference between the maximum value xXmax and minimum value xXmin in the x-axis direction exceeds a third set value Klx and the difference between the maximum value yYmax and minimum value yYmin in the y-axis direction exceeds a fourth set value Kly.

Operations of the microcomputer 22 will hereinbelow be described with reference flow charts of FIGS. 5 and 6. In this embodiment, a decision is automatically made in terms of errors being introduced in the output of the azimuth detection unit 1, and the requirement of the one revolution of the motor vehicle M for obtaining the errors is indicated on the indicator 4 and in response to the indication the motor vehicle M is circle-driven by the vehicle driver by about 360-degrees after the closing operation of the switch 3.

Figure 5:
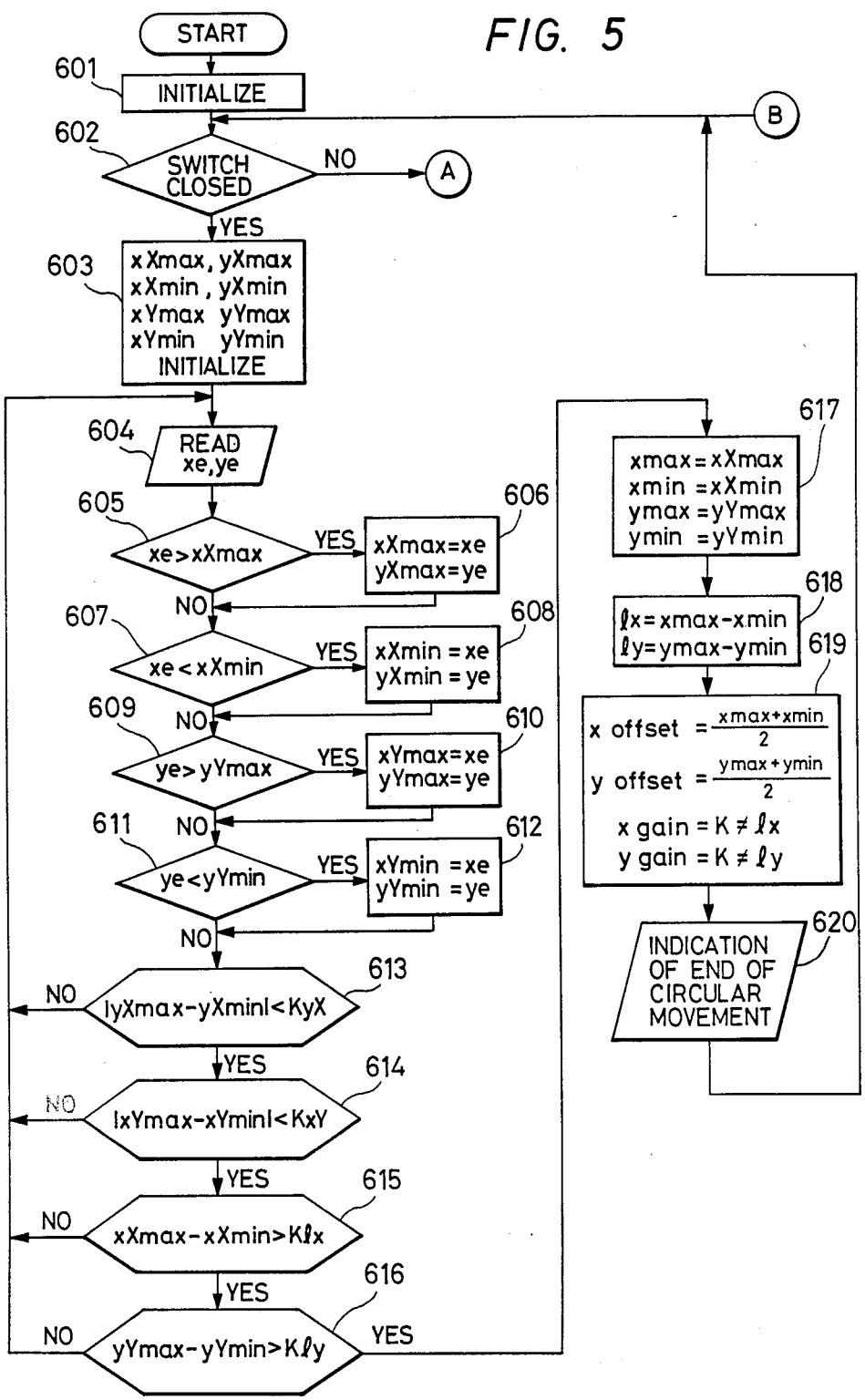
FIGS. 5 and 6 are flow charts of programs provided for the FIG. 1 apparatus according to the embodiment of the invention.
Figure 6:
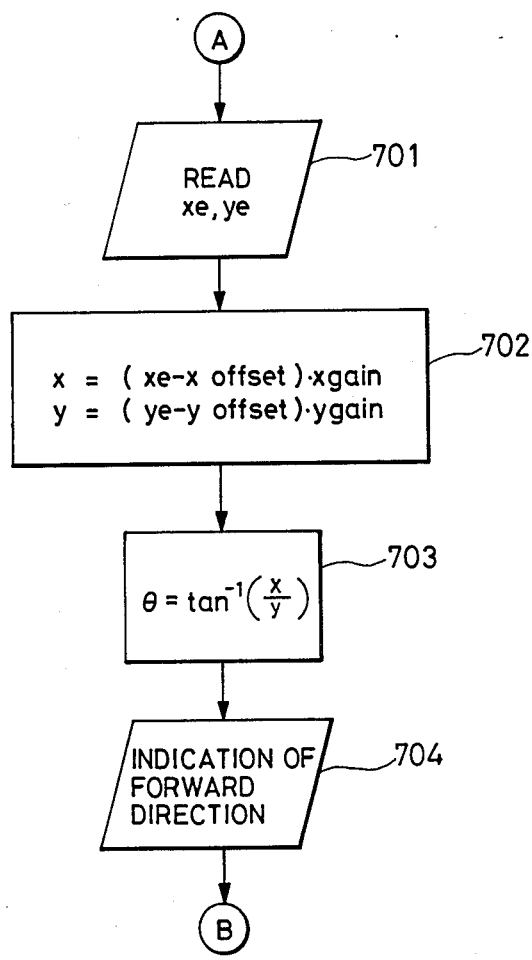

The microcomputer 22 is powered in response to the turning-on of the ignition key of the motor vehicle M and processes the outputs of the azimuth detection unit 1 in accordance with the flow charts of FIGS. 5 and 6.

The program execution starts at a step 601 for initialization of memories, registers and so on. The initialization step 601 is followed by a step 602 which is provided for checking the opening and closing states of the switch 3. If closed, control advances to a step 603 to set an initial value of the register used for the following operations. Here, values (xXmax, yXmax), (xXmin, yXmin), (xYmax, yYmax) and (xYmin, yYmin) are set as outputs (xe, ye) of the azimuth detection unit 1 at the time of the closing of the switch 3. It is also appropriate that for the initial value the maximum and minimum values possibly obtained by the azimuth detection unit 1 are set to xXmax, yYmax and xXmin, yYmin.

A subsequent step 604 is executed to read the output (xe, ye) of the azimuth detection unit 1. The following steps 605 through 612 are provided for determining whether the output (xe, ye) read in the step 604 is maximum or minimum after the start of the one revolution. If it is the maximum value or minimum value, the output (xe, ye) is stored in the memory. For example, if a description is made with respect to xe, the step 605 determines that xe is greater than xXmax. If so, xe is set to xXmax and ye is set to yXmax in the step 606. If not, the step 606 is followed by the step 607 to determine that x is smaller than xXmin. If smaller, xe is set to xXmin and ye is set to yYmin in the step 608. If greater, control proceeds to the step 609. The similar decision in terms of ye is made in the steps 609 through 612.

Steps 613 through 616 are provided for determining the accuracy of xXmax, xXmin, yYmax and yYmin obtained in the steps 605 through 612. Here, when conditions indicated by the following equations (5), (6), (7) and (8) satisfied, control goes to step 617, and when there is at least one condition which is not satisfied, the operational flow returns to the step 604.

$$|yXmax - yXmin| < KyX \quad (5)$$

$$|xYmax - xYmin| < KxY \quad (6)$$

$$|xXmax - xXmin| < Klx \quad (7)$$

$$|yYmax - yYmin| < Kly \quad (8)$$

where KyX, KxY, Klx and Kly are constants.

In the step 617, xXmax, xXmin, yYmax and yYmin obtained in the steps 605 through 612 are set respectively to xmax, xmin, ymax and ymin. In a step 618, the diameter lx of the ellipse $C_R$ in the X-axis directions and the diameter ly thereof in the Y-axis directions are computed in accordance with the following equations (9) and (10).

$$lx = xmax - xmin \quad (9)$$

$$ly = ymax - ymin \quad (10)$$

In a step 619, Xoffset, Yoffset indicative of error vector $\vec{Ve}$ and amplification degree correction amount Xgain, Ygain are calculated in accordance with the following equations (11) through (14).

$$Xoffset = (xmax + Xmin)/2 \quad (11)$$

$$Yoffset = (ymax - ymin)/2 \quad (12)$$

$$Xgain = K/lx \quad (13)$$

$$Ygai = K/ly \quad (14)$$

In a step 620, the fact of termination of the one revolution for correction is indicated on the indicator 4. In response to the indication, the driver will stop the circular movement of the motor vehicle M.

On the other hand, when it is determined in the previous step 602 that the switch 3 is not closed, the program operations of FIG. 6 begines with a step 701 to read the output signal (xe, ye) of the azimuth detection unit 1. In a subsequent step 702, (xe, ye) is corrected to (x, y) with Xoffset, Yoffset, Xgain and Ygain obtained in the routine of FIG. 5, that is, it is obtained in accordance with the following equations (15) and (16).

$$x = (xe - Xoffset) \cdot Xgain \quad (15)$$

$$y = (ye - Yoffset) \cdot Ygain \quad (16)$$

In a step 703, the azimuth of the motor vehicle M is calculated with (x, y) in the step 702 in accordance with the following equation (17).

$$\theta = \tan^{-1}(x/y)$$

In a step 704, the azimuth of the forwad direction F of the motor vehicle M is indicated on the indicator 4 on the basis of $\theta$ obtained in the step 703. In this embodiment, the azimuth of the vehicle M is omnidirectionally indicated in stepless fashion. It is also appropriate that it is indicated in division fashion and it is inputted into an apparatus for indicating the present position of a vehicle on a map on a CRT display.

In the above-described operations of the microcomputer 22, the routine of FIG. 6 is executed ordinarily because of opening of the switch 3. When the microcomputer detects errors in the output of the azimuth detection unit 1, the requirement of the circular movement of the vehicle M is indicated on the indicator 4 and in response to the indication the switch 3 is closed by the driver so that the routine of FIG. 5 is executed. The presence of the errors in the output of the azimuth detection unit 1 can be checked on the basis of the absolute value of the output thereof, i.e., in accordance with whether the absolute value being greater than a set value.

Although in the above description the amplification degree correction amount Xgain, Ygain is obtained in accordance with the equations (13) and (14) and (xe, ye) is corrected to (x, y) in accordance with the equations (15) and (16), it is also appripriate that they are executed in accordance with the following equations.

$$Gain = (Ymax - Ymin)/(Xmax - Xmin) \quad (18)$$

$$x = (xe - Xoffset) \cdot Gain \quad (19)$$

$$y = (ye - Y\text{offset}) \quad (20)$$

In the above-described embodiment, the accuracy of the maximum and minimum values is determined on the basis of the output of the azimuth detection unit 1 obtained during the one revolution of the motor vehicle M. This results in prevention of erroneous judgment of one revolution termination even if the rotating direction of the vehicle M is varied during the circular movement, and hence makes possible to accurately obtain the maximum and minimum values irrespective of the variations of the rotating direction.

Furthermore, in this embodiment, it is not necessarily limited to one revolution of the motor vehicle, and it is possible to obtain the maximum and minimum values by abou three-fourth revolution. A further reduction of the rotating angle can be achieved by making greater the first and second constants KyX, KxY.

Furthermore, although in the above-mentioned embodiment the error in the x-axis direction is obtained on the basis of the maximum and minimum values in the x-axis direction and the error in the y-axis direction is obtained on the basis of the maximum and minimum values in the y-axis direction, it is also appropriate that the error in the y-axis direction is calculated on the basis of the value on the y-axis obtained when a value in the x-axis direction is maximum and the value on the y-axis obtained when a value in the x-axis direction is minimum and on the other hand the error in the x-axis direction is calculated on the basis of the value on the x-axis obtained when a value in the y-axis direction is maximum and the value on the value in the x-axis obtained when a value in the y-axis direction is minimum.

Still further, obtaining the error in the x-axis direction can be achieved by calculating the average of the x-axis direction outputs of two azimuth vectors by which the y-axis direction outputs become substantially equal to each other, and obtaining the error in the y-axis direction can be achieved by calculating the average of the y-axis direction outputs of two azimuth vectors by which the x-axis direction outputs become substantially equal to each other.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention. For example, although in the above-description the present invention is applied for check of the azimuth vector obtained during the circular movement of a motor vehicle for correction, the present invention is applicable for check of the azimuth vectors obtained during random travelling of the motor vehicle.

What is claimed is:

1. An azimuth determination apparatus attached to a moving body, comprising:
    means for generating orthogonal first and second component signals in response to earth magnetism;
    means responsive to said orthogonal first and second component signals for computing the forward direction of said moving body;
    means for detecting two of azimuth vectors obtained on the basis of said orthogonal first and second component signals, first components of said two azimuth vectors being maximum and minimum;
    means for determining that the difference between second components of said two azimuth vectors is below a predetermined value; and
    means for correcting said orthogonal first and second component signals on the basis of said two azimuth vectors in accordance with a result of the determination.

2. An azimuth determination apparatus attached to a moving body, comprising:
    means for generating orthogonal X and Y component signals in response to earth magnetism;
    means responsive to said orthogonal X and Y component signals for computing the forward direction of said moving body;
    means for detecting first pair vectors and second pair vectors of azimuth vectors obtained on the basis of said orthogonal X and Y component signals, one of said first pair having a maximum X component and the other of said first pair having a minimum X component, one of said second pair having a maximum Y component and the other of said second pair having a minimum Y component;
    means for determining that the difference between the Y components of said first two vectors is below a first predetermined value and the difference between the X components of said second two vectors is below a second predetermined value; and
    means for in response to the determination obtaining a X component error on the basis of said first two vectors and obtaining a Y component error on the basis of said second two vectors and for correcting said orthogonal X and Y component signals.

* * * * *